United States Patent [19]

Clausen et al.

[11] Patent Number: 4,632,597
[45] Date of Patent: Dec. 30, 1986

[54] RELEASABLE LOCKING ASSEMBLY

[75] Inventors: Eivind Clausen; Michael G. Allsop, both of Bellingham, Wash.

[73] Assignee: Allsop, Inc., Bellingham, Wash.

[21] Appl. No.: 379,765

[22] Filed: May 19, 1982

[51] Int. Cl.⁴ .............................................. F16B 2/04
[52] U.S. Cl. .................................... 403/351; 248/412; 403/104
[58] Field of Search ...................... 248/411, 412, 649; 403/104, 350, 351, 352

[56] References Cited

U.S. PATENT DOCUMENTS

| | | | |
|---|---|---|---|
| 3,667,788 | 6/1972 | Greenwood | 403/104 |
| 3,724,885 | 4/1973 | Becker | 403/104 |
| 4,076,437 | 2/1978 | Mazzola | 248/411 X |
| 4,360,281 | 11/1982 | Alsup, Jr. et al. | 403/351 X |
| 4,419,026 | 12/1983 | Leto | 403/104 |
| 4,466,152 | 8/1984 | Moss et al. | 403/104 X |

Primary Examiner—J. Franklin Foss
Assistant Examiner—David L. Talbott
Attorney, Agent, or Firm—Hughes & Cassidy

[57] ABSTRACT

A telescoping support post having a bell member slide mounted thereon to engage a mouth of a musical instrument in a manner to support the instrument. The inner telescoping member has a releasable holding member eccentrically mounted thereon. This holding member has a resilient finger frictionally engaging the inner surface of the outer telescoping member to insure proper locking and release action. In addition, the holding member has cooperating stop means to limit rotation between these two positions.

A similar device is operatably positioned between the bell member and the upper telescoping member so that the bell member can be adjusted vertically on the second telescoping member and held in any selected position.

3 Claims, 16 Drawing Figures

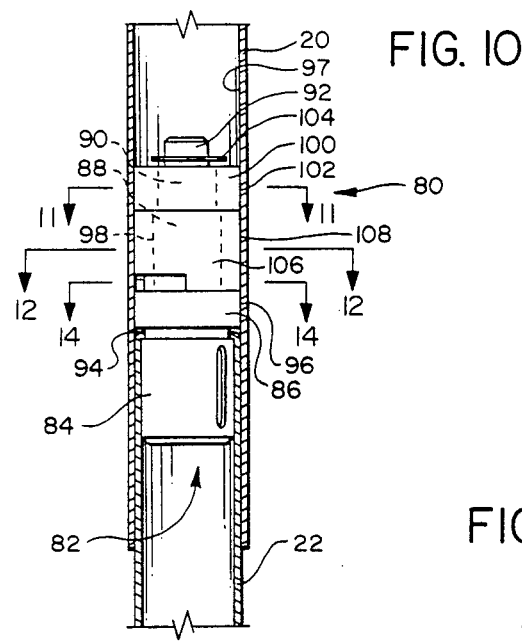
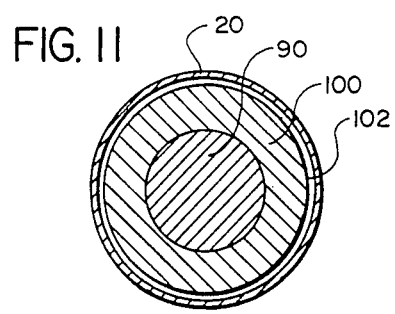
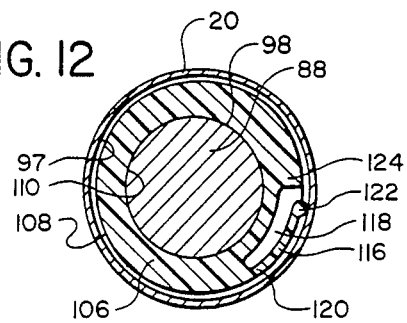
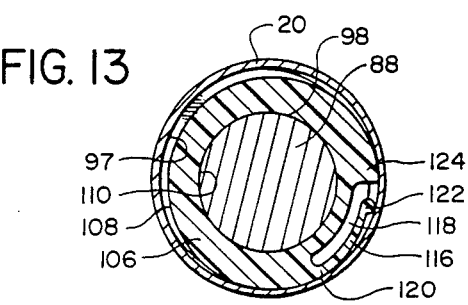
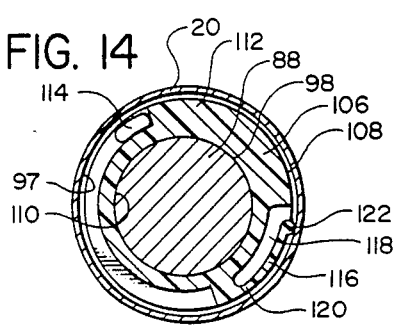
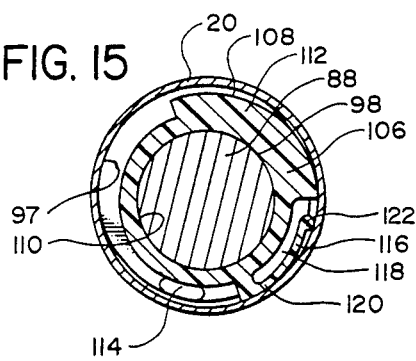
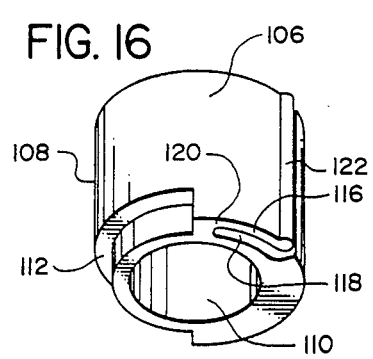

RELEASABLE LOCKING ASSEMBLY

BACKGROUND OF THE INVENTION

The present invention relates generally to a support assembly where the individual support members can be slide mounted longitudinally relative to one another, and be releasably held in selected positions. More particularly, the present invention relates to such a support assembly particularly adapted for use in a musical instrument support stand.

There has recently been developed by the assignee of the present patent application a quite convenient musical support stand for trumpets, trombones, or other instruments. Such a support stand comprises a base member in the form of a tripod and a telescoping post extending upwardly from the tripod. A bell shaped support member, adapted to engage the mouth of the instrument to be supported is mounted to the upper telescoping member of the post. The bell shaped member can be moved vertically along the length of the upper telescoping member to the desired height. This support stand can be easily assembled and adjusted to conveniently support the instrument at a desired location along the length of the post.

One of the key considerations in the design of such a support stand is the manner in which the two post members and the bell support can be adjusted relative to one another and then held in place. One solution is to provide the proper degree of frictional engagement between the components that are slide mounted relative to one another so that a person would normally be able to overcome the frictional force to move the components to the desired positions. However, once in the desired positions, there would be sufficient frictional force to cause the components to remain in those positions during normal size. However, this is a less than totally desirable compromise. A more desirable approach would be to provide a positive positioning or locking device or devices so that little force is required to move the components to the desired position, and once in place, the components are held quite reliably and firmly in such position.

There are in the prior art a number of releasable locking or positioning devices which can be used for a variety of applications. A search of the U.S. Patent literature has disclosed a number of such devices and these are given below.

U.S. Pat. No. 185,105, How, illustrates a tool holder where there is a shank of a tool having an end section that is flattened along one side, and a second section adjacent to the end having side recessed portions. The end of this shank member can be inserted into the tool holder and rotated to a location to keep the members joined together. When the flattened end portion of the shank is out of specific alignment with the tool holder, it cannot be withdrawn from the tool holder.

U.S. Pat. No. 808,992, Lawson, discloses an extendable handle where there are two telescoping members. One of the members has a pair of concentric tubular portions defining an annular passageway in which the other telescoping members fit. At one end of one of the members, there is a rotatable cam which moves against mating cam members to move the cam members outwardly into locking relationship to hold the telescoping members in place.

U.S. Pat. No. 2,168,188, Bernhard, shows a collapsable umbrella having a telescoping handle. There are a pair of rotatable discs which can be moved to lock the handle in place.

U.S. Pat. No. 2,397,382, Smith, shows a locking device where two members can be attached end to end. One of the members has a socket which has a somewhat oval cross section. The other member has a mating stud which fits into the socket, with the stud also having an oval configuration. By turning the members relative to one another, the stud comes into wedging engagement with the socket.

U.S. Pat. No. 3,515,418, Nielsen, Jr., discloses a locking mechanism for a telescoping assembly where there is a cam sleeve mounted around a rotatable cam member that is attached to one end of one of the telescoping members. By rotating the member having the cam, the sleeve is pushed outwardly into wedging engagement with outer telescoping member.

U.S. Pat. No. 3,825,359, Fulton, shows a releasable mounting device for cylindrical objects such as electrical circuit elements. There's a base having an internal opening to receive the member. At the end of the base, there is a locking ring with an eccentric annular inner surface. By turning the ring relative to the base, it moves out of alignment with the base and thus presses against the member to lock it in place.

U.S. Pat. No. 3,833,012, McAllister, discloses an adjustable tent pole. There is a pair of axially adjustable telescoping tubes, the smaller of which carries a plug with a freely rotatable eccentrically mounted knurled ring thereon. The ring is eccentrically mounted on an eccentric axis of rotation. To lock the two tubes together, the two tubes are tilted with respect to each other so that the ring is pressed against the outer tube. The two tubes are then rotated so that the ring moves eccentrically to press against the outer tube and thus wedge it in place.

U.S. Pat. No. 3,836,273, Gutman, et. al., discloses a detachable telescopic joint where the outer tubular member has three sections. The middle section is circular, and the two outer sections are oval shaped. With the longer axes of the two oval shaped sections being at right angles to one another.

U.S. Pat. No. 3,942,826, Lester, discloses a lock assembly for connecting two members, such as two tubes. One member has a socket that is stepped, and the other member has a stud with two stepped circular sections to fit into the socket. However, the center axis of the sockets and the stud sections are off-set so that by rotating the two tube members, the two tube members come into locking engagement.

U.S. Pat. No. 4,231,574, Williams, shows an arrangement rather similar to the Lester patent noted above. This permits the two parts of a handle of a cue stick to be connected end to end.

While the above patents do show devices which can be locked one to another by rotating the two components relative to one another, such devices have certain short comings. In some of the devices, the rotation can be in either direction to cause locking engagement. This sometimes leads to confusion as to whether the person is rotating the component so as to bring them more firmly into locking engagement or actually releasing the components. Another difficulty is that with some of the devices which use freely rotating components, engagement of the locking components is not totally reliable.

Accordingly, it is an object of the present invention to provide a releasable locking mechanism of the general type discussed above, which operates reliably and simply. It is a further object to produce such a mechanism which can be conveniently and economically manufactured and assembled.

SUMMARY OF THE INVENTION

Within the broader aspects of the present invention, the releasable locking assembly of the present invention comprises a first member having a first cylindrical surface concentrically arranged about a first longitudinal axis. There is a second member having a second cylindrical surface concentrically arranged about a second longitudinal axis offset from the first axis. Further, there is a third locking member having third and fourth cylindrical surfaces concentrically arranged about third and fourth longitudinal axes, respectively, with the third and fourth axes being offset from one another.

The third member is rotatably mounted relative to at least one of said first and second members, and adapted to be positioned with the third surface engaging the first surface and the fourth surface engaging the second surface. The third member is rotatable to a first hold position where the first and third surfaces and the second and fourth surfaces are engaged in wedging relationship to prevent relative axial movement between the first and second members, and to a second release position where the first and third surfaces and the second and fourth surfaces are out of wedging engagement to permit relative axial movement between the first and second members.

The third member and said one of the first and second members have cooperating stop means to limit relative rotation between the first and second positions to less than 360°. Another arrangement is to have the cooperating stop means arranged to limit the relative rotation to about half of a complete revolution. A further variation is to have the cooperating stop means arranged to limit the relative rotation to less than about one half of a revolution.

In a preferred arrangement, the third member is rotatably mounted relative to both of the first and second members.

In a further specific arrangement of the present invention, the first cylindrical surface is an inwardly facing surface and the second cylindrical is an outwardly facing surface positioned within the first surface. The first and second surfaces define an annular space having a first thicker space portion and a second thinner space portion. The first and second space portions are generally diametrically opposed to one another, and the third locking member comprises a locking portion having a generally annular configuration and fitting into said annular opening. The stop means comprises a first stop member connected to the third member and rotatable therewith, and a second stop member connected to the first member and adapted to abutt against said first stop member in at least said second position.

In a further specific preferred embodiment, the third member comprises a knob portion connected to the locking portion and spaced axially therefrom. The knob portion has an outwardly facing gripping surface which can be grasped to rotate said third member between its first and second positions.

A further specific feature is that the first member comprises a first main body poriton and a sleeve insert fitting into the body portion. The sleeve insert has the first surface thereon and is positioned around the locking portion. The knob portion is spaced axially from the insert.

In a specific configuration, the second member comprises an elongate post, and the first member comprises a mounting member movable along the post. The sleeve insert is positioned at one end of the body portion so as to be able to be placed in the body portion. The sleeve insert and the body portion have matching tongue and groove means to prevent relative rotation between the sleeve insert and the body portion. Further, the locking portion has an outwardly extending lip means engaging matching groove means in the insert, so as to prevent relative axial movement between the insert and the third member.

In another embodiment, the third locking member comprises an outwardly pressing yielding surface means positioned to be in substantially constant yielding engagement with the first surface to create a frictional force between the first and third members sufficient to prevent relative rotational movement between said third and first members while there is relative rotation between said second and third members. Desirably, the yielding surface means comprises a resilient finger member positioned at said third surface and urged outwardly with respect to third surface. In a specific configuration the third member is formed with a circumferentially aligned slot to form the finger portion, with the finger porion having a free end with an outwardly extending protruding portion to engage the first surface.

A specific application of a second embodiment of the present invention is in a telescoping tube assembly where there is a first elongate outer tubular member and a second inner tubular member. The third locking member is mounted to the interior tubular member at one end thereof for rotation about an axis offset from the longitudinal center axis of the two tubular members. The third locking member is mounted at one end of the inner tubular member. In the preferred form, there is a mounting insert having a base portion fixed to the inner tubular member. There are a pair of longitudinally spaced centering discs means connected to the base portion and fitting against the inner surface of the first outer tubular member, and a mounting cylinder extending between said two disc means, with a center axis offset from said center axis of said centering disc mean. The third locking member is in the form of an annular member which rotates eccentrically into locking engagement. The annular member and at least one of the centering discs means have cooperating stop means.

Other features will be coming apparant from the following detailed description.

BRIEF DESCRIPTION OF THE DRAWING

FIG. 10 is a longitudinal view, showing the two tubular sections of a support post of the present invention in section, and showing a second locking device of the present invention in side elevational view;

FIG. 11 is a sectional view taken along line 11—11 of FIG. 10;

FIG. 12 is a sectional view taken along line 12—12 of FIG. 8, with the locking device in its release position;

FIG. 13 is a sectional view taken at the same location as 12—12, showing the locking device in its hold position;

FIG. 14 is a sectional view taken along line 14—14, showing the locking device in its release position;

FIG. 15 is a sectional view taken at the same location as 14—14, showing the locking device in its hold position; and FIG. 16 is an isometric view of a locking member of the device of FIGS. 10-15.

DESCRIPTION OF THE PREFERRED EMBODIMENTS

Figure 1:
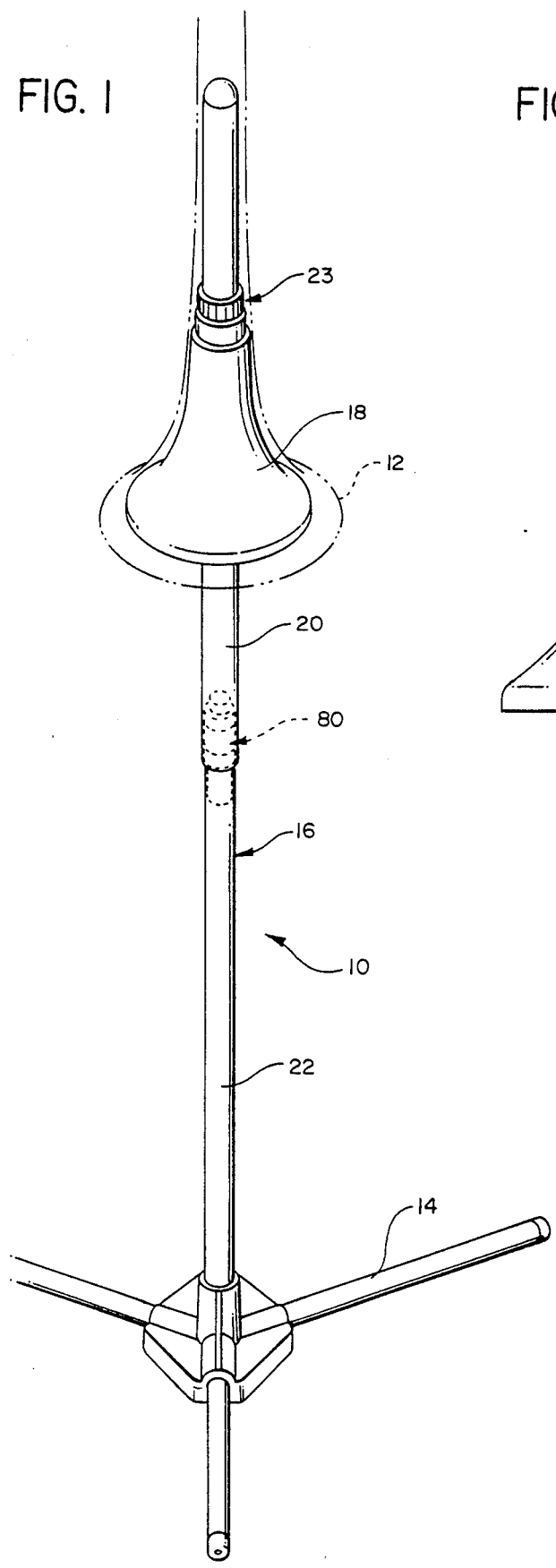
FIG. 1 is an isometric view of a support stand for a musical instrument, this support stand incorporating the novel features of the present invention.
Figure 2:
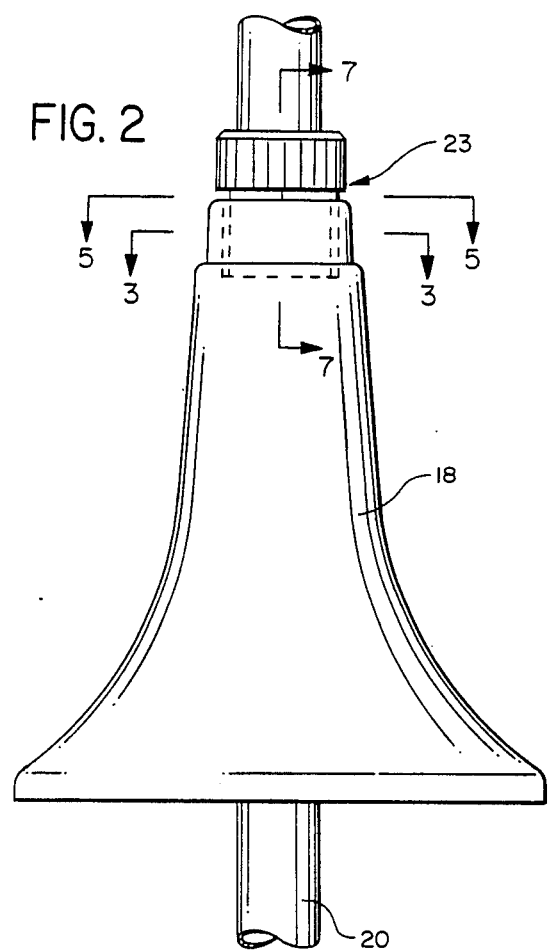
FIG. 2 is a side elevational view of the mounting bell member incorporating one of the locking devices of the present invention.

In FIG. 1, there is shown a support stand 10 for a musical instrument, shown in broken lines at 12. This support stand comprises a tripod-like base 14, a vertical support post 16, and a bell shaped mounting member 18. The support post 16 is made up of upper and lower tubular telescoping members 20 and 22, respectively. The lower member 22 is vertically mounted on the base 14, and the bell shaped member 18 is mounted for vertical side movement on the upper member 20.

There are two embodiments of the present invention. The first is a locking assembly by which the bell member 18 can be fixed at any location along the length of the upper tubular member 20. The second embodiment is a locking assembly which permits the two telescoping members 20 and 22 to be moved axially relative to one another and then locked in any desired position.

It is believed that a better appreciation of the convenience features of the present invention will be achieved by preceding the detailed description of the present invention with a brief description of the operation of the musical instrument support stand 10. This stand 10 can be collapsed and stored in the interior of the instrument 12. This is accomplished by moving the telescoping members 20 and 22 one down over the other and disassembling the tripod-like base 14. The legs of the base 14 are of different diameters and can be stored one inside the other. The bell shaped member 18 is slid downwardly to the bottom end of the two telescoping members 20 and 22, and the three tubular tripod legs are stored in the interior of the innermost telescoping member 22. In this position, the bell member 18 fits within the open-ended mouth of the instrument 12, with the other components fitting inside the throat of the instrument 12.

When the support stand 10 is to be assembled into its functioning position, first the tripod base 14 is assembled. The two telescoping members 20 and 22 are extending to the desired location, and then the bell shaped mounting member 18 is moved upwardly on the upper tubular member 20 to the desired supporting location.

From the above description, it is readily apparent that it is highly desirable to arrange these components so that the two telescoping members 20 and 22 and the bell member 18 can quite easily be moved axially, and also be moved between the hold and release positions rather conveniently. It is possible to simply have the members 18, 20 and 22 have a sufficiently tight frictional fit, which is not so great as to oppose relative movement therebetween, but is sufficient to provide firm support. However, that would be simply a poor compromise. If the frictional fit produces a resisting force sufficient to provide complete certainty as to the support function, it would likely prove to be somewhat inconvenient for the person wanting to move the components quickly and easily to the desired location. On the other hand, if the frictional fit produces too little resisting force, the user might find the instrument unexpectedly descending to a lower support location. Thus, there arises the need for a convenient locking mechanism which has a release position to permit easy adjustment and a hold position to provide secure support. Further, the operation of the device must be reliable, simple and convenient. It is to this problem that the present invention is directed.

With reference to FIGS. 2 through 9, there is shown a first embodiment of the present invention which is a releasable locking device 23 to position the bell member 18 on the upper tubular support member 20. This device 23 comprises a sleeve insert 24 and a positioning member 26. The bell member 18 is formed with a longitudinally aligned, cylindrically shaped through opening 28 defined by an interior cylindrical surface 30 that fits closely around the outer surface 32 of the upper member 20. At the upper end of the bell member 18, the opening 28 is enlarged or stepped outwardly concentrically with the center line of the opening 28, so that there is an annular step or shoulder 34 and a cylindrical surface 36 having a diameter moderately larger than that of the cylindrical surface 30. Thus, the surface 36 forms with the outer surface 32 of the tube member 20 an annular cylindrical space.

The sleeve insert 24 is positioned in the upper end of the bell member 18, fitting snuggly against the cylindrical surface 36. To prevent relative rotation between the insert 24 and the bell member 18, there is a tongue and groove connection made up of an outwardly protruding vertically aligned ridge 38 on the outer surface of the insert 24, and a matching vertical groove 40 formed in the bell member 18 at the inner surface 36. Thus, the insert 24 can be conveniently slipped down into the recess defined by the surface 36, with the tongue and groove connection 38-40 preventing the relative rotation between the insert 24 and the bell member 18.

The positioning member 26 comprises an upper knob portion 42 and a lower sleeve-like cam portion 44. The knob portion 42 has an outer cylindrical knurled surface that has a diameter moderately larger than the outside diameter of the sleeve insert 24. This knurled surface 46 can be gripped in the person's fingers to rotate the positioning member 26 between its release and hold positions.

The outer surface 48 of the cam portion 44 is cylindrically shaped and has an outside diameter just slightly smaller than that of the inner surface 50 of the sleeve insert 24. The lower edge of the cam portion 44 is formed with an outwardly extending peripheral lip 52 that fits within a matching annular groove 54 formed in the lower edge of the insert 24. Thus, while the positioning member 26 can be rotated relative to the insert 24, the matching lip 52 and groove 54 prevent relative axially movement between the positioning member 26 and the sleeve insert 24. The members 24 and 26 are made of molded plastic and have sufficient resilience so that the insert 24 can be forced over the lip 52 into the assembled position shown in FIG. 7.

Figure 3:
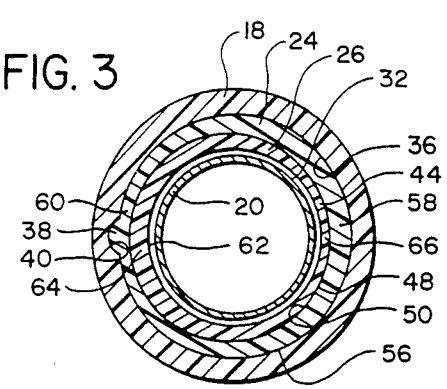
FIG. 3 is a sectional view taken along line 3—3 of FIG. 2, showing the locking mechanism in its release position.
Figure 4:
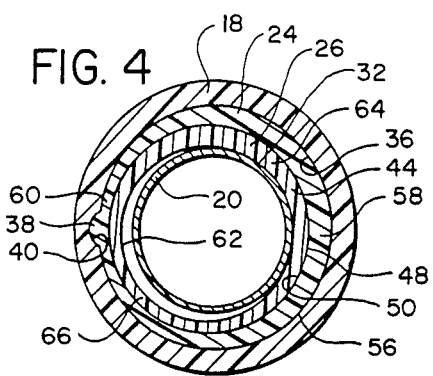
FIG. 4 is a sectional view taken at the same location as 3—3, which shows the locking mechanism rotated into its hold position.

It will be noted that the inner surface 50 of the insert 24 is formed eccentrically relative to the outer cylindrical surface 56 of the insert 24. Thus, as can be seen in FIGS. 3 and 4, the thickness of the insert 24 has a thicker portion, indicated at 58, and a thinner portion, indicated at 60. From the thinner portion 60, the thickness of the insert 24 increases gradually around the circumference of the insert to reach a maximum at the thicker location 58.

In like manner, the outer surface 48 of the cam portion 44 is slightly eccentric relative to the inner cylindrical surface 62 of the cam portion 44 and the knob portion 42, this inner surface 62 having a diameter just slightly larger than the outer surface 32 of the upper tubular member 20.

The effect of this is that the cam portion 44 has a relatively thick portion 64 and a relatively thin portion 66. The thickness of the cam portion 44 increases from the thinner portion 66 around the circumference of the cam portion 44 to the location of the thicker portion 64.

At the upper edge of the insert 24, there is an upperwardly protruding stop member 68 having an arcuate length along said upper edge of approximately 30°. There is a second stop member 70 which protrudes downwardly from the lower edge of the knob portion 46, and this has an arcuate length of approximately 90°. Alternatively, the arcuate length of the two stop members 68 and 70 can be increased to about 180° so that there is movement only between the full release position and the full locking position. The two stop members 68 and 70 are at the same circumferential location relative to the longitudinal center axis so that rotation of the positioning member relative to the insert 24 can cause the two stop members 68 and 70 to come into engagement with one another, as illustrated in FIG. 5.

Figure 5:
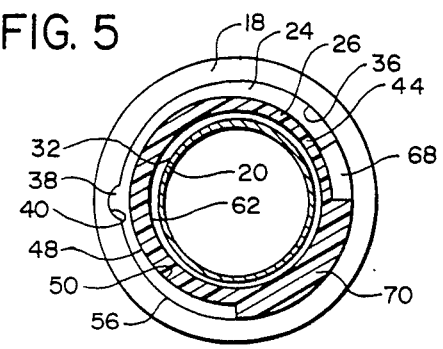
FIG. 5 is a sectional view taken along line 5—5 of FIG. 2, showing the locking mechanism in its release position.

To describe the operation of this first embodiment shown in FIGS. 3-9, let it be assumed that the positioning member 26 is in its release position as shown in FIGS. 3 and 5.

In this position, the thicker portion 64 of the cam portion 44 is positioned against the thinner portion 60 of the insert 24. Thus, the thinner portion 66 of the cam portion 44 is in like manner positioned against the thicker portion 58 of the insert 24. In this location, the offset or eccentricity of the inner cylindrical surfaces 50 and 62 of the insert 24 and the cam portion 44 compensate one another so that the inner cylindrical surface 62 is concentrically aligned with the center axis 72 of the upper tubular member 20. In this position, the positioning member 26 will slip freely over the tubular member 20, so that the bell member 18 can be easily moved to any location along the length of the telescoping member 20. Also, in this position, the stop members 68 and 70 are engaged one against the other so that the positioning member 26 cannot be moved any further in a counterclockwise direction, as viewed in FIG. 5.

Figure 6:
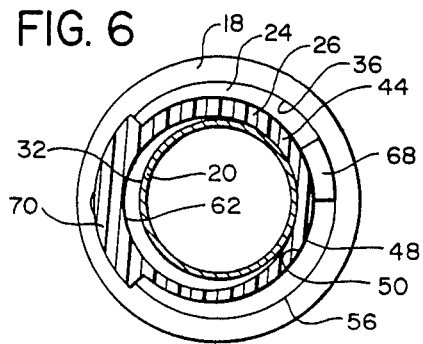
FIG. 6 is a sectional view taken at the same location as 5—5, showing the locking mechanism rotated to its hold position.
Figure 7:
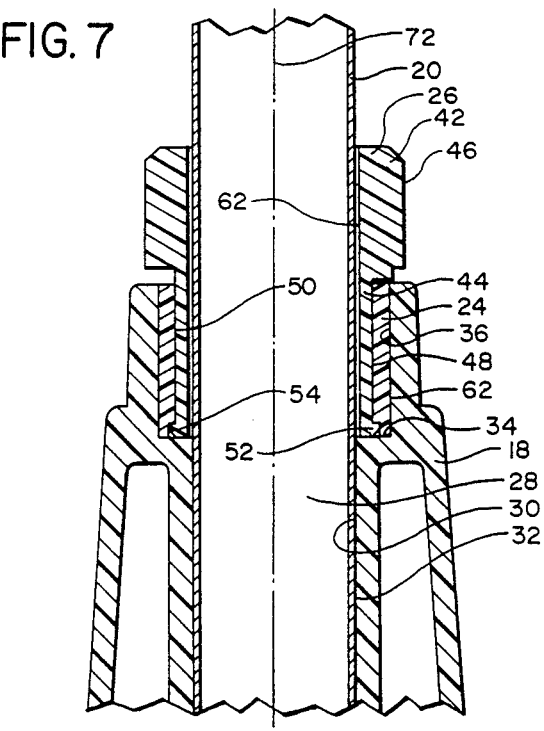
FIG. 7 is a longitudinal sectional view taken along line 7—7 of FIG. 2.
Figure 8:
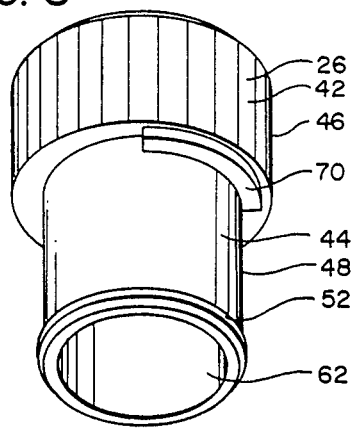
FIG. 8 is an isometric view, showing the locking member of the locking device of FIGS. 2-7 separate from the assembly.
Figure 9:
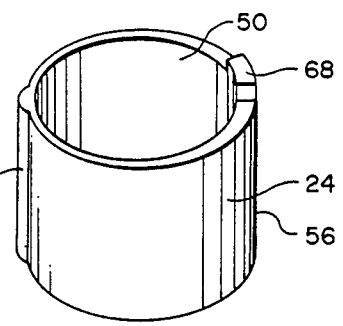
FIG. 9 is an isometric view of a locking sleeve of the locking device of FIGS. 2-7, shown separate from the assembly.

Let it now be assumed that the mounting member 18 has been moved to the desired vertical location. Then the person grips the knurled surface 46 of the knob portion 42 and rotates the positioning member 26 in a clockwise direction (as seen in FIG. 5). This causes the thicker portion 64 of the cam portion 44 to move within the insert 24 to come closer to the thicker insert portion 58. This in turn causes the positioning member 26 to shift out of concentric alignment with the tube member 20 so that the inner surface 62 of the member 26 begins to press against the side surface 32 of the tubular member 20. This causes the bell member 18 to be held or locked in that position. The hold position of the positioning member 26 is illustrated in FIGS. 4 and 6. As shown in those figures, a rotation of the positioning member 26 of about 135° accomplishes sufficient frictional engagement to securely hold the bell member 18 in place. It can easily be recognized, however, that the components can be sized relative to one another so that greater or lesser amounts of rotation will create adequate locking or holding engagement.

When it is desired to move the bell member 18 from that position, the positioning member 26 is simply rotated in a counterclockwise direction (as seen in FIG. 5) toward the position of FIG. 5. When the stop members 68 and 70 come into engagement, the person then knows that the positioning member 26 is in the release position and the bell member 18 can easily be moved axially along the upper member 22.

To describe the second embodiment of the present invention, reference is now made to FIGS. 10-16. This second locking device, generally designated 80, is mounted to the upper end of the lower inner tube member 22. As indicated previously, this second locking device in its release position permits the two telescoping tubes 20 and 22 to be freely moved axially relative to one another, and holds or locks the two members 20 and 22 at any selected location.

This second locking device 80 comprises a first member 82 which is desirably made as a single intergral piece. This first member 82 comprises a cylindrical base 84, a first centering disc 86, an offset mounting cylinder 88, a concentric mounting cylinder 90, and an upper stub portion 92. The base 84 fits snugly in and is fixedly held within the upper end of the lower tubular member 22. Between the base and the first centering disc 86, there is an annular groove 94, and the upper edge of the tube 22 is pressed or deformed inwardly into the groove 94. To prevent relative rotation between the base 84 and the tube 22, the base 84 can be formed with a vertical groove, with the adjacent portion of the tube 22 being deformed inwardly into such groove. However, it is obvious that other means could be used to fixedly secure the base 84 in the upper end of the tube 22.

The centering disc 86 has an outer cylindrical surface 96 which has an outside diameter just slightly less than the inside diameter of the inner surface 97 of the upper tube 20. The first offset mounting cylinder 88 extends upwardly from the centering disc 86 and has its vertical center axis slightly offset from the longitudinal center axis about which the base 84 and first disc 86 are concentrically arranged. The diameter of the cylindrical surface 98 of the cylinder 88 is moderately less than that of the centering disc 86. Thus, this surface 98 forms with the tubular inner surface 97 an annular gap, the width of which varies around the circumference of the gap.

The second mounting cylinder 90 is concentrically aligned with the base 84 and first centering disc 86 and extends upwardly from the mounting cylinder 88. A second centering disc 100 is mounted over the second cylinder 90. The second disc 100 has an outer cylindrical surface 102 of the same diameter as the cylindrical surface 96 of the first disc 86, so that it too fits concentrically within the tube 20. To hold the second disc 100 in place, a push nut 104 is pressed onto the stud 92.

The second locking device 80 further comprises a locking or holding sleeve 106, rotatably mounted about the offset cylinder 88 at a location between the first and second centering discs 86 and 100. The locking sleeve 106 has an outer cylindrical surface 108, and is formed with a through central opening defined by an inner cylindrical surface 110. The inner surface 110 is moderately offset relative to the outer surface 108.

The lower edge of the sleeve 106 is formed with an arcuately shaped stop member 112 which extends approximately 180° around the bottom circumferential edge of the sleeve 106. There is a second stop member 114 which extends upwardly from an edge portion of the first centering disc 86. This second stop member has an arcuate length of approximately 30°, thus permitting approximately 150° relative rotation between the locking sleeve 106 and the first member 82. However, this can be changed to permit a full 180° relative rotation to full locking position.

At the cylindrical surface 108 of the locking sleeve 106, there is provided a finger or tab member 116 which presses radially outwardly against the inner surface 97 of the upper tubular member 20. This finger 116 can conveniently be provided by forming the sleeve 106 with a circumferentially aligned slot 118 having an arcuate length of approximately 45°. Thus, the finger 116 is circumferentially aligned, having a root end 120 at the base of the slot and an outer end 122 at the opposite end of the slot 118. The outer end 122 is enlarged slightly so that in the unrestrained position of the finger 116, this outer end enlargement 122 extends radially outwardly beyond the cylinder defined by the surface 108. With this arrangement of the finger 116, the entire locking sleeve 106 can be conveniently molded as a single plastic piece. Thus, the finger 116 presses outwardly with a moderate force so that the outer end enlargement 122 frictionally engages the inner surface 97 of the tube 20.

To describe the operation of this second embodiment, let it be assumed that the locking sleeve 106 is in the position shown in FIGS. 12 and 14. It can be seen that the sleeve 106 has a thicker portion 124 which is positioned in the thicker part of the annular gap defined by the mounting cylinder 88 and the tube 20. In this position, the sleeve 106 is concentrically aligned with the first and second centering discs 86 and 100. Also, as can be seen in FIG. 14, in this position, the stop members 112 and 114 engage one another. If the lower tube 22 is rotated in a clockwise direction (as seen in FIGS. 12 and 14), the stop member 114 engages the stop member 112 to cause the locking sleeve 106 to rotate with the lower tube 22, so that the sleeve 106 remains concentric with the discs 86 and 100. Thus, in that direction, the two tubes 20 and 22 are freely rotatable with respect to one another.

However, if the lower tube 22 is rotated in a counterclockwise direction (as seen in FIGS. 12 and 14), the locking sleeve 106 will not rotate with the lower tube 22. The reason for this is that the finger 116 frictionally engages the inner surface 97 of the upper tube 20 to resist such rotation. Thus, when the lower tube 22 rotates in that direction, the eccentrically mounted mounting cylinder 88 slides against the inner surface 110 of the sleeve 106 toward the position of FIG. 13. This causes the sleeve 106 to be moved out of concentric alignment with the discs 86 and 100 so as to press against the inner surface 97 of the upper tube 20. Thus, the two tubes 20 and 22 come into locking engagement with one another. Normally, the rotational movement between the two tubes 20 and 22 will not carry the stop member 114 completely around to engage the stop member 112. However, if this does occur, the engagement of the stop members 112 and 114 will prevent further rotation that would make the wedging engagement yet more severe. Release of the two tubular members 20 and 22 is accomplished simply by rotating the two tubular members 20 and 22 relative to one another in the opposite direction. As indicated above, the tubes can continuously be rotated toward the release direction without causing any locking engagement of the sleeve 106.

From the above description, it is readily apparent that locking engagement is accomplished by relative rotation of the tubes 20 and 22 in only one direction. The normal tendency is for the user to rotate the upper tube 20 in a clockwise direction for tightening, since this is the direction of rotation which is usual for tightening threaded fittings. Thus, the user, already accustomed to this manner of use, will not have confusion as to which way the tubes 20 and 22 should be rotated between the release and hold positions.

It is to be recognized that various modifications can be made without departing from the novel features of the present invention.

We claim:
1. A releasable locking assembly comprising:
  a. a first outer tubular member having a longitudinal center axis and an inwardly facing generally cylindrical first surface defining a longitudinally aligned opening;
  b. a second member adapted to fit within said first member so as to be movable between a first locked position and a second freely rotating position, said second member having an upper end and a lower end, and comprising:
    1. a first centering disc means at a first lower axial location having a second peripheral cylindrical surface fitting closely against the first surface of the first tubular member so as to be concentric therewith;
    2. an offset mounting cylinder means at a second axial location above said first location, said offset mounting cylinder means having a third outer cylindrical surface of a diameter less than that of the second cylindrical surface of the first centering disc means, and a center axis offset from said longitudinal center axis;
    3. a concentric mounting cylinder means at a third axial location above said second axial location and having a center axis concentric with said longitudinal center axis;
  c. a locking sleeve mounted around said offset mounting cylinder means at an axial location between said first centering disc means and said concentric mounting cylinder means, so as to be rotatable about the center axis of the offset mounting cylinder means, said locking sleeve having a fourth outer cylindrical surface having a center axis offset from the center axis of the offset mounting cylinder means, said locking sleeve being rotatable relative to said second member between a first release position where the fourth surface is in closer alignment with the second surface, and a second locking position where said fourth surface is further from alignment with the second surface and in wedging engagement with said first surface;

d. said locking sleeve having an outwardly pressing yielding surface means positioned to be in substantially constant yielding engagement with said first surface and to create a frictional force between said first outer tubular member and the locking sleeve sufficient to prevent relative rotational movement between the first outer tubular member and the locking sleeve while there is relative rotational movement between the first and second members;

e. a second centering disc means removably mounted around said concentric mounting cylinder means and having a fifth peripheral cylindrical surface fitting closely against the first surface of the first tubular member so as to be concentric therewith, and retaining said locking sleeve in position around said offset mounting cylinder means;

f. said yielding surface means comprising a resilient member which is urged outwardly into engagement with the first surface of the outer tubular member, said yielding surface means further comprising a finger positioned at said third surface, with said finger pressing outwardly into engagement with said first surface; and g. said locking sleeve being formed with a generally tangentially aligned slot to form said finger, and said finger has an outer end with an outwardly protruding portion to engage said first surface.

2. A releasable locking assembly comprising:

a first outer tubular member having a longitudinal center axis and an inwardly facing generally cylindrical first surface defining a longitudinally aligned opening;

b. a second member adapted to fit within said first member so as to be movable between a first locked position and a second freely rotating position, said second member having an upper end and a lower end, and comprising:

1. a first centering disc means at a first lower axial location having a second peripheral cylindrical surface fitting closely against the first surface of the first tubular member so as to be concentric therewith;

2. an offset mounting cylinder means at a second axial location above said first location, said offset mounting cylinder means having a third outer cylindrical surface of a diameter less than that of the second cylindrical surface of the first centering disc means, and a center axis offset from said longitudinal center axis;

3. a concentric mounting cylinder means at a third axial location above said second axial location and having a center axis concentric with said longitudinal center axis;

c. a locking sleeve mounted around said offset mounting cylinder means at an axial location between said first centering disc means and said concentric mounting cylinder means, so as to be rotatable about the center axis of the offset mounting cylinder means, said locking sleeve having a fourth outer cylindrical surface having a center axis offset from the center axis of the offset mounting cylinder means, said locking sleeve being rotatable relative to said second member between a first release position where the fourth surface is in closer alignment with the second surface, and a second locking position where said fourth surface is further from alignment with the second surface and in wedging engagement with said first surface;

d. said locking sleeve having an outwardly pressing yielding surface means positioned to be in substantially constant yielding engagement with said first surface and to create a frictional force between said first outer tubular member and the locking sleeve sufficient to prevent relative rotational movement between the first outer tubular member and the locking sleeve while there is relative rotational movement between the first and second members;

e. a second centering disc means removably mounted around said concentric mounting cylinder means and having a fifth peripheral cylindrical surface fitting closely against the first surface of the first tubular member so as to be concentric therewith, and retaining said locking sleeve in position around said offset mounting cylinder means;

f. said locking sleeve and said second member having cooperating stop means to limit relative rotation of the locking sleeve and the second member between said first and second positions, whereby said first and second members are rotated only in a first direction to be brought into the first position, and rotated only in a second direction to be brought to the second position, said stop means being arranged to limit rotation of said locking sleeve between its first and second positions to less than 360°;

g. said yielding surface means comprising a resilient member which is urged outwardly into engagement with the first surface of the outer tubular member; and h. said locking sleeve being formed with a generally tangentially aligned slot to form said finger, and said finger has an outer end with an outwardly protruding portion to engage said first surface.

3. The assembly as recited in claim 2, wherein said stop means is arranged to limit relative rotation of said locking sleeve with respect to the second tubular member to no greater than about one half of a revolution.

* * * * *